(12) United States Patent
Martynovich et al.

(10) Patent No.: US 10,693,697 B2
(45) Date of Patent: Jun. 23, 2020

(54) APPARATUS AND METHOD FOR REDUCING PEAK TO AVERAGE RATIO IN WIRELESS COMMUNICATION SYSTEM

(71) Applicant: Samsung Electronics Co., Ltd., Gyeonggi-do (KR)

(72) Inventors: Pavel Martynovich, Gyeonggi-do (KR); Jae-Bum Kim, Seoul (KR); Jung-Hwan Moon, Seoul (KR); Tae-Young Min, Gyeonggi-do (KR); Young-Yoon Woo, Gyeonggi-do (KR); Mun-Woo Lee, Gyeonggi-do (KR); Jae-Hyung Im, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/110,346

(22) PCT Filed: Dec. 4, 2014

(86) PCT No.: PCT/KR2014/011829
§ 371 (c)(1),
(2) Date: Jul. 7, 2016

(87) PCT Pub. No.: WO2015/105280
PCT Pub. Date: Jul. 16, 2015

(65) Prior Publication Data
US 2016/0337155 A1    Nov. 17, 2016

(30) Foreign Application Priority Data

Jan. 7, 2014  (KR) .......................... 10-2014-0001768

(51) Int. Cl.
*H04B 1/62* (2006.01)
*H04B 1/04* (2006.01)
*H04L 27/26* (2006.01)

(52) U.S. Cl.
CPC .......... *H04L 27/2621* (2013.01); *H04B 1/04* (2013.01); *H04B 1/0475* (2013.01); *H04B 1/62* (2013.01)

(58) Field of Classification Search
CPC  H04B 1/0475; H04B 2001/0408; H04B 1/04; H04B 1/62; H04L 27/2614; H04L 27/2621
See application file for complete search history.

(56) References Cited

U.S. PATENT DOCUMENTS 7,697,591 B2 *  4/2010  Copeland ............... H04B 1/707
                                                    375/130
8,681,893 B1 *  3/2014  Brunn ................. H04L 27/2071
                                                    375/295

(Continued)

FOREIGN PATENT DOCUMENTS

CN        1531293        9/2004
CN        101068233      11/2007

(Continued)

OTHER PUBLICATIONS

PCT/ISA/237 Written Opinion issued on PCT/KR2014/011829 (pp. 8).

(Continued)

*Primary Examiner* — Betsy Deppe
(74) *Attorney, Agent, or Firm* — The Farrell Law Firm, P.C.

(57) ABSTRACT

The purpose of the present invention is to reduce the Peak-to-Average Ratio (PAR) of a transmission signal. A transmission device includes a generation part for generating a cancellation pulse corresponding to a peak component of a transmission signal, and a cancellation part for attenuating the peak component using the cancellation pulse. In addi- (Continued)

tion, the present invention includes some embodiments other than the aforesaid embodiment.

10 Claims, 13 Drawing Sheets

(56) References Cited

U.S. PATENT DOCUMENTS

| | | | |
|---|---|---|---|
| 8,861,304 B1 * | 10/2014 | Cope | G11C 7/1075 365/189.09 |
| 2004/0179468 A1 | 9/2004 | Jaenecke et al. | |
| 2010/0246714 A1 | 9/2010 | Yang et al. | |
| 2011/0268167 A1 | 11/2011 | Sundstrom | |
| 2012/0163489 A1 | 6/2012 | Ramakrishnan | |
| 2013/0177057 A1 | 7/2013 | Pavel et al. | |

FOREIGN PATENT DOCUMENTS

| | | |
|---|---|---|
| CN | 101867541 | 10/2010 |
| CN | 103036840 | 4/2013 |
| EP | 1 811 732 | 7/2007 |
| KR | 1020130080939 | 7/2013 |

OTHER PUBLICATIONS

PCT/ISA/210 Search Report issued on PCT/KR2014/011829 (pp. 3).
European Search Report dated Sep. 5, 2017 issued in counterpart application No. 14877605.7-1874, 8 pages.
Chinese Office Action dated Jan. 17, 2018 issued in counterpart application No. 201480074968.7, 17 pages.
Korean Office Action dated Oct. 2, 2019 issued in counterpart application No. 10-2014-0001768, 8 pages.
KR Notice of Patent Grant Filed Apr. 2, 2020 issued in counterpart application No. 10-2014-0001768, 5 pages.

\* cited by examiner

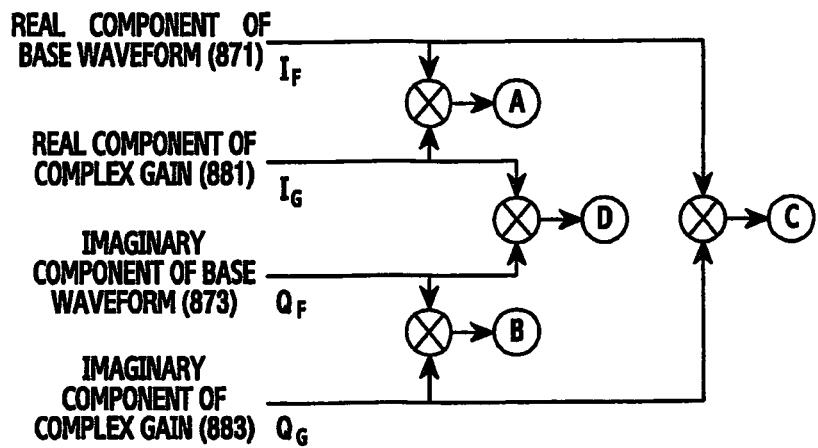
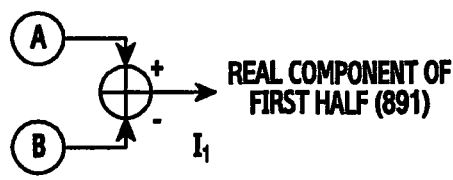
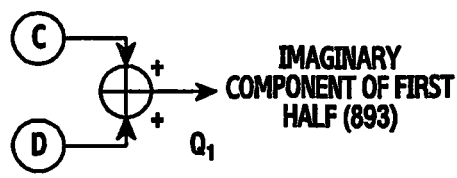
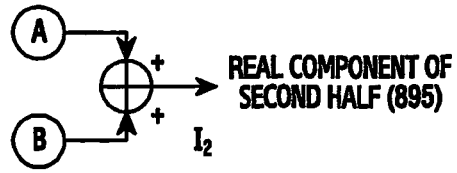
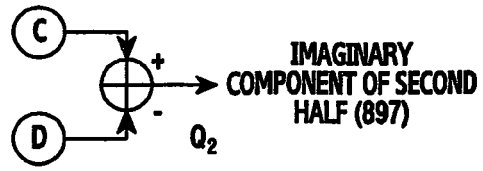
FIG.8

US 10,693,697 B2

APPARATUS AND METHOD FOR REDUCING PEAK TO AVERAGE RATIO IN WIRELESS COMMUNICATION SYSTEM

PRIORITY

This application is a National Phase Entry of PCT International Application No. PCT/KR2014/011829, which was filed on Dec. 4, 2014, and claims priority to Korean Patent Application No. 10-2014-0001768, which was filed on Jan. 7, 2014, the contents of each of which are incorporated herein by reference.

TECHNICAL FIELD

The present invention relates to reducing a Peak-to-Average Ratio (PAR) in a wireless communication system.

BACKGROUND ART

A Peak-to-Average Ratio (PAR) or crest factor of a signal is a ratio between an average level of the signal and a maximum magnitude of the signal. FIG. 1 illustrates an example of a transmission signal in a wireless communication system. A signal s(t) on a time axis is shown in FIG. 1. The PAR or the crest factor implies a ratio of a maximum value 110 against an average level of the s(t). In general, the crest factor may be calculated in a dB scale. Therefore, the PAR or the crest factor may be given in a logarithm form of a ratio between an average signal level and a peak.

If the signal has a high PAR, a high power amplifier is required which operates with large input back-off. Accordingly, amplification of the signal having the high PAR is not effective in general. Therefore, there is a need to propose an effective alternative for reducing the PAR.

DISCLOSURE OF INVENTION

Technical Problem

An exemplary embodiment of the present invention provides an apparatus and method for reducing a Peak-to-Average Ratio (PAR) of a signal in a wireless communication system.

Another exemplary embodiment of the present invention provides an apparatus and method for cancelling or attenuating a peak component of a signal in a wireless communication system.

Another exemplary embodiment of the present invention provides an apparatus and method for generating a cancellation pulse for cancelling a peak component of a signal in a wireless communication system.

Another exemplary embodiment of the present invention provides an apparatus and method for reducing a time of generating a cancellation pulse in a wireless communication system.

Another exemplary embodiment of the present invention provides an apparatus and method for generating a cancellation pulse by using a symmetry property of a basic waveform for the cancellation pulse in a wireless communication system.

Solution to Problem

According to an exemplary embodiment of the present invention, an apparatus for a transmission device in a wireless communication system includes a generator for generating a cancellation pulse corresponding to a peak component of a transmission signal, and a cancelling unit for attenuating the peak component by using the cancellation pulse, wherein the generator generates a first part which is a portion of the cancellation pulse, and generates a second part which is the remaining portions by using a symmetric property of a basic waveform for the cancellation pulse.

According to another exemplary embodiment of the present invention, a method of operating a transmission device in a wireless communication system includes generating a cancellation pulse corresponding to a peak component of a transmission signal, and attenuating the peak component by using the cancellation pulse, wherein the generating of the cancellation pulse comprises generating a first part which is a portion of the cancellation pulse, and generating a second part which is the remaining portions by using a symmetric property of a base waveform for the cancellation pulse.

Advantageous Effects of Invention

Since a cancellation pulse is generated by using a symmetry property of a base waveform for the cancellation pulse in a wireless communication system, a time of generating the cancellation pulse is decreased. Accordingly, it is possible to process all of a plurality of peak components which are continuously generated on a time axis.

BRIEF DESCRIPTION OF DRAWINGS

FIG. 8 is a conceptual view illustrating a procedure of generating a cancellation pulse in a wireless communication system according to an exemplary embodiment of the present invention;

BEST MODE FOR CARRYING OUT THE INVENTION

The present invention will be described herein below with reference to the accompanying drawings. In the following description, well-known functions or constructions are not described in detail since they would obscure the invention in unnecessary detail. Also, the terms used herein are defined according to the functions of the present invention. Thus, the terms may vary depending on user's or operator's intension and usage. That is, the terms used herein must be understood based on the descriptions made herein.

Hereinafter, the present invention describes a technique for reducing a Peak-to-Average Ratio (PAR) of a signal in a wireless communication system.

In the following descriptions, a signal may consist of complex numbers, for example, a real component and an imaginary component. The real component may be referred to as an 'I component', and the imaginary component may be referred to as a 'Q component'. For transmission, the complex signal requires two separated wires, one of which is for the I component and the other one of which is for the Q component. Therefore, even if a signal path is illustrated as one path in the figure described hereinafter, it may be interpreted that the one path includes a path for the I component and a path for the Q component.

Further, in general, the complex signals are expressed as a magnitude envelope. The envelope is a curve in contact with all curves having a regularity, and an envelope of a Radio Frequency (RF) signal indicates a change in a magnitude of a low-frequency component other than a high-frequency signal. Therefore, a signal illustrated in the figure described below may be interpreted as an illustration of an envelope.

The PAR may be reduced by detecting a peak from a given signal and by attenuating or cancelling the peak. Accordingly, various exemplary embodiments of the present invention describe a technique for reducing the PAR by cancelling the peak.

Figure 1:
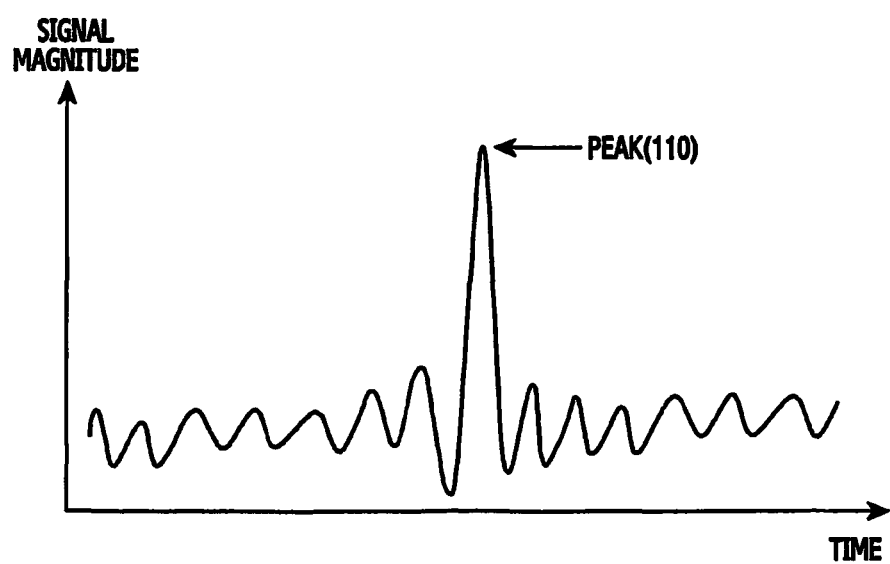
FIG. 1 illustrates an example of a transmission signal in a wireless communication system.
Figure 2:
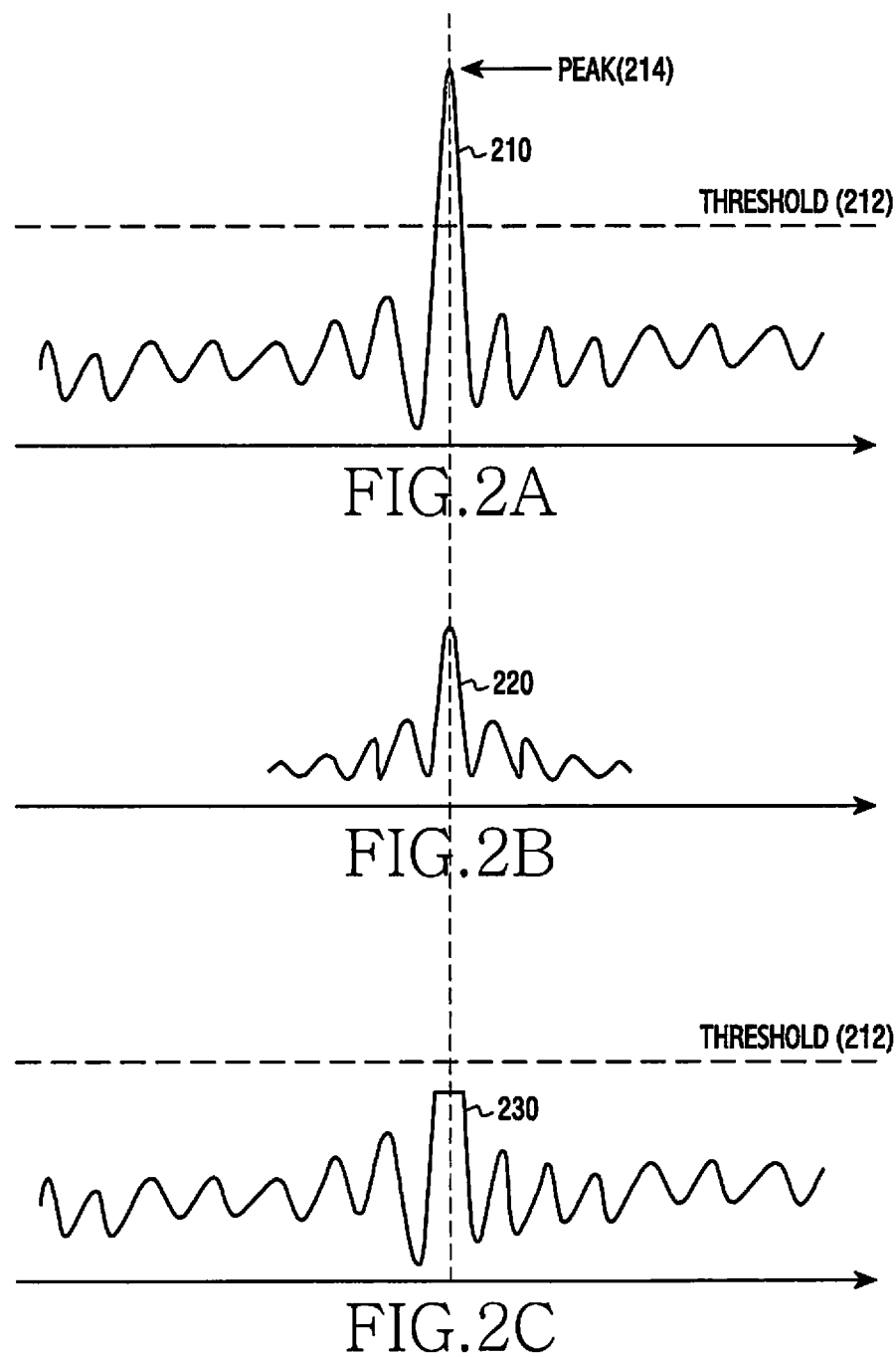
FIGS. 2A to 2C illustrate a method of reducing a Peak-to-Average Ratio (PAR) in a wireless communication system according to an embodiment of the present invention.

FIGS. 2A to 2C illustrate a method of reducing a PAR in a wireless communication system according to an embodiment of the present invention. Specifically, FIG. 2A illustrates an initial signal 210, FIG. 2B illustrates a cancellation pulse 220 for cancelling a peak, and FIG. 2C illustrates a peak-cancelled signal 230.

Referring to FIG. 2A, when the initial signal 210 is generated, a peak 214 exceeding a pre-defined threshold 212 is detected from the signal through peak detection. Upon detection of a position and magnitude of the peak 214, as shown in FIG. 2B, the cancellation pulse 220 is generated in accordance with the magnitude and position of the peak 214. A specific waveform of the cancellation pulse 230 is pre-defined according to a signal characteristic of a system. That is, the cancellation pulse 220 may be generated by scaling a pre-defined signal pattern according to a complex gain which is in proportion to the peak 214. Thereafter, the cancellation pulse 220 shown in FIG. 2B is subtracted from the initial signal 210 shown in FIG. 2A to obtain the peak-cancelled signal 230 shown in FIG. 2C, that is, the signal 230 of which a PAR is reduced.

Figure 3:
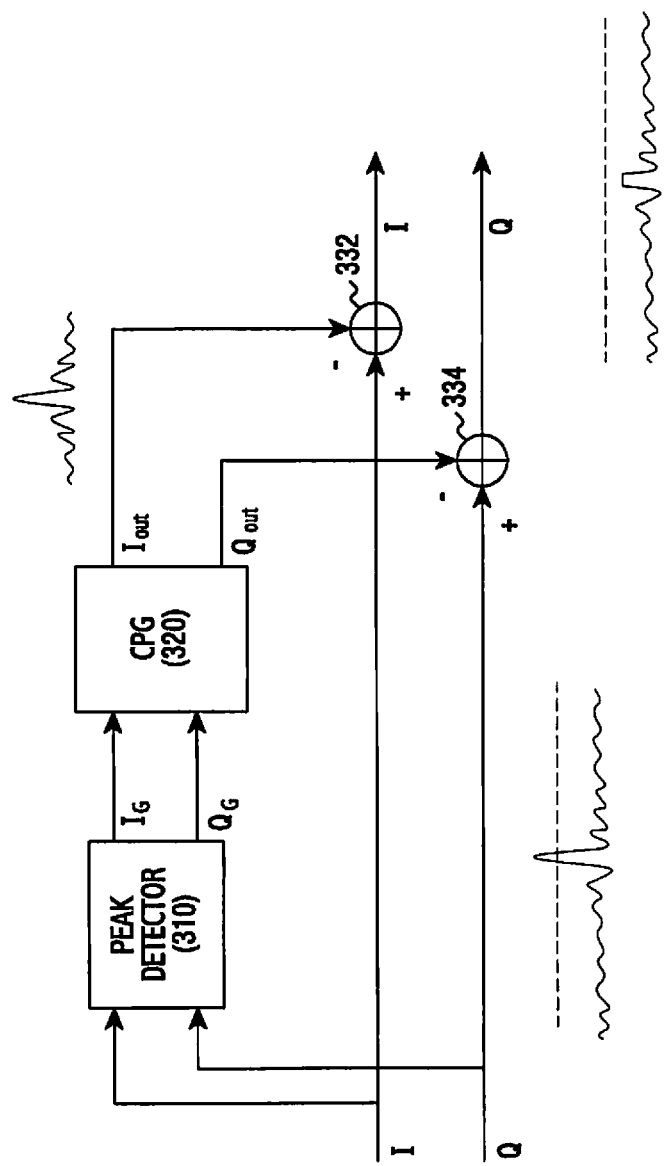
FIG. 3 illustrates a block diagram of a means for reducing a PAR in a wireless communication system according to an exemplary embodiment of the present invention.

FIG. 3 illustrates a block diagram of a means for reducing a PAR in a wireless communication system according to an exemplary embodiment of the present invention. A block diagram of a device for reducing the PAR by using the method shown in FIGS. 2A to 2C is exemplified in FIG. 3.

Referring to FIG. 3, the means for reducing the PAR includes a peak detector 310, a Cancellation Pulse Generator (CPG) 320, and subtractors 332 and 334.

The peak detector 310 is provided with I and Q components of an input signal, calculates a signal magnitude by using the I and Q components, and thereafter detects at least one peak. The peak implies signal samples having a magnitude exceeding a threshold. That is, the peak detector 310 detects a signal duration having a magnitude exceeding the threshold from the input signal. Specifically, the peak detector 310 detects a position of the peak and a magnitude of the peak. Further, the peak detector 310 provides the CPG 320 with a complex gain corresponding to the position of the peak and the magnitude of the peak.

The CPG 320 generates a cancellation pulse for cancelling the peak. A specific waveform of the cancellation pulse is pre-defined according to a signal characteristic of a system. That is, the CPG 320 includes a module for scaling a base waveform of the cancellation pulse according to the complex gain. The base waveform may be referred to as a 'noise shaping filter'. The module for performing the scaling may include at least one complex multiplier. Accordingly, the CPG 320 multiplies the base waveform of the cancellation pulse by the complex gain to generate the cancellation pulse for attenuating or cancelling the peak detected by the peak detector 310.

The subtractors 332 and 334 respectively correspond to the I component and the Q component, and subtract the cancellation pulse from the input signal. Accordingly, the peak may be attenuated or cancelled from the input signal. That is, the peak is cancelled as shown in FIG. 2C through a subtraction operation of the subtractors 332 and 334.

As shown in FIG. 3, when a peak exceeding a threshold is generated in an input signal, the means for reducing the PAR according to the exemplary embodiment of the present invention generates a cancellation pulse corresponding to the peak and subtracts the cancellation pulse from the input signal, thereby reducing the PAR of the signal. In this case, the means for reducing the PAR processes peaks on a one-by-one basis. That is, the CPG included in the means for reducing the PAR is dedicated for one peak during one time duration, that is, during a specific time duration.

The CPG may operate on the one-by-one basis for each peak, and may process only one peak at any given moment. Accordingly, a cancellation pulse is generated also on the one-by-one basis, and for example, only one cancellation pulse may be generated at one time point. This implies that the cancellation pulse cannot overlap on a time axis. A new peak cannot be accepted until one peak currently being processed is completely processed. Due to the operation performed on the one-by-one basis, a processing time for one peak is the same as a length of the cancellation pulse. For example, if the cancellation pulse includes N samples, a new peak generated within a time of the N samples cannot be accepted. Accordingly, if a plurality of peaks are generated continuously in a contiguous manner on the time axis, there may be a deterioration in peak cancellation performance.

Figure 4A:
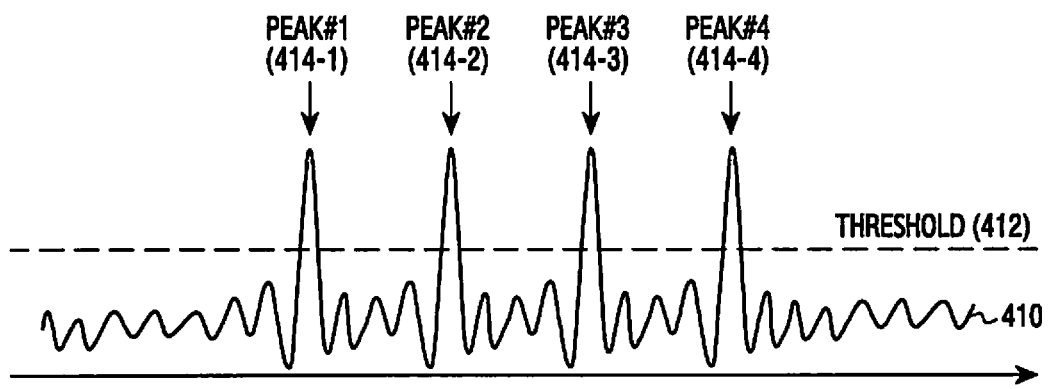
FIGS. 4A to 4C illustrate an example of a result of processing continuous peaks in a wireless communication system according to an exemplary embodiment of the present invention.
Figure 4B:
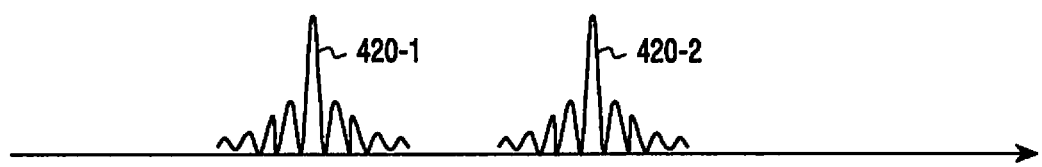
Figure 4C:
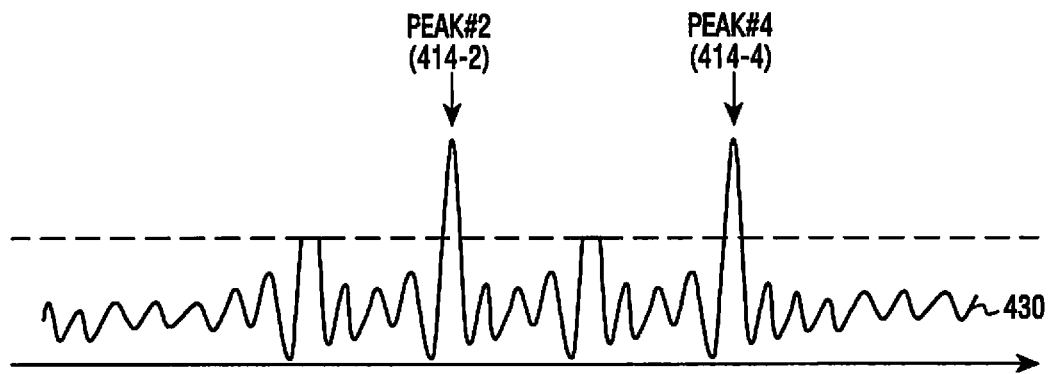

FIGS. 4A to 4C illustrate an example of a result of processing continuous peaks in a wireless communication system according to an exemplary embodiment of the present invention. Specifically, FIG. 4A illustrates an initial signal 410, FIG. 4B illustrates cancellation pulses 420-1 and 420-2, and FIG. 4C illustrates a peak-cancelled signal 430.

Referring to FIG. 4A, the initial signal 410 includes 4 peaks 414-1 to 414-4 exceeding a threshold 412. The peak #1 414-1 is detected and is successfully accepted. Accordingly, as shown in FIG. 4B, the cancellation pulse #1 420-1 is generated to cancel the peak #1 414-1. The cancellation pulse #1 420-1 is generated in such a manner that time alignment is maintained with respect to the peak #1 414-1. However, since the peak #2 414-2 appears within a processing time of the peak #1 414-1, the peak #2 414-2 is ignored. In other words, since the cancellation pulse #1 420-1 for the peak #1 414-1 is not completely generated yet, the peak #2 414-2 cannot be accepted.

When the processing time (e.g., a time of N samples) of the cancellation pulse #1 420-1 elapses, a CPG may be open again to process another peak. Accordingly, the peak #3 414-3 is accepted, and the cancellation pulse #2 420-2 for the peak #3 414-3 is generated. However, since the peak #4 414-4 is generated again within a processing time of N samples after the peak #3 414-3, the peak #4 414-4 is ignored. That is, although the 4 peaks 414-1 to 414-4 are generated, only the two cancellation pulses 420-1 and 420-2 are generated.

As a result, since only the two cancellation pulses 420-1 and 420-2 are subtracted from the initial signal 410, as shown in FIG. 4C, the peak #1 414-1 and the peak #3 414-3 are cancelled. However, since cancellation pulses for the peak #2 414-2 and the peak 34 414-4 are not generated, the peak #2 414-2 and the peak #4 414-4 are still maintained without a loss.

As described above, when peaks are generated continuously, not all peaks can be cancelled since the cancellation pulse cannot be generated as frequently as an interval of the peaks. As one solution for cancelling all of the peaks, a plurality of CPGs for generating the cancellation pulse are provided. However, this may require an increase in hardware resources in quantity, and eventually may cause a cost increase. Accordingly, the present invention proposes various exemplary embodiments capable of cancelling all of the peaks without an increase of the CPG.

According to the various exemplary embodiments of the present invention, a processing time of the CPG is reduced. As described above, in order to generate the cancellation pulse, the CPG multiplies coefficients of a noise shaping filter by a complex gain. The cancellation pulse has the same length as the noise shaping filter. A task is not complete until the end of the multiplication performed on all of the coefficients, and this shows a relation between the processing time of the CPG and the length of the cancellation pulse. When the length of the noise shaping filter is reduced, the processing time will be reduced, but this leads to a deterioration of signal quality.

Figure 5:
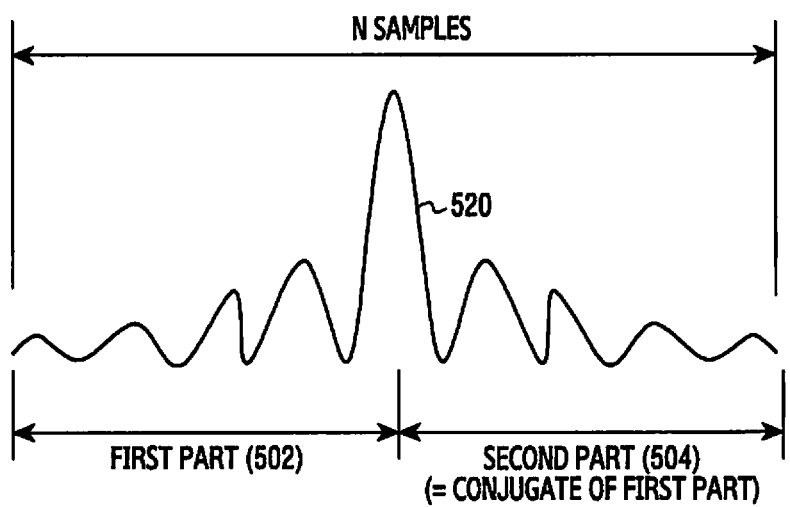
FIG. 5 illustrates a characteristic of a base waveform for a cancellation pulse in a wireless communication system according to an exemplary embodiment of the present invention.

FIG. 5 illustrates a characteristic of a base waveform for a cancellation pulse in a wireless communication system according to an exemplary embodiment of the present invention. The base waveform may be referred to as a 'noise shaping filter'.

Referring to FIG. 5, a base waveform 520 consists of N samples. A specific waveform of the base waveform 520 is pre-defined according to a signal characteristic of a system. The base waveform 520 is divided into a first part 502 and a second part 504, by a maximum value. The first part 502 may be referred to as a 'first half of the cancellation pulse', and the second part 504 may be referred to as a 'second half of the cancellation pulse'.

As shown in FIG. 5, the first part 502 and the second part 504 have a symmetry property. In other words, the first part 502 and the second part 504 are symmetric to each other. However, the first part 502 and the second part 504 have a conjugate relation. As a result, coefficients of each sample belonging to the first part 502 and coefficients of each sample belonging to the second part 504 are identical in reverse order, except for a conjugate operation. The conjugate operation implies that an imaginary component of a complex number is inverted.

By using the symmetry property of the base waveform for the cancellation pulse described above with reference to FIG. 5, a transmission device according to the exemplary embodiment of the present invention may simultaneously generate the first half and second half of the cancellation pulse. Specifically, a method of generating the cancellation pulse according to the exemplary embodiment of the present invention may include two steps.

In a first step, a half of the noise shaping filter is multiplied by a complex gain. In this case, a multiplication result of the noise shaping filter and the complex gain is generated, and at the same time, a multiplication result of the conjugated noise shaping filter and the complex gain is generated. Herein, the multiplication result of the noise shaping filter and the complex gain is the first half of the cancellation pulse, and the multiplication result of the conjugated noise shaping filter and the complex gain is the second half of the cancellation pulse. However, coefficients belonging to the second half are generated in reverse order. In this case, the second half generated in reverse order is stored in a memory buffer. In a second step, values stored in the memory buffer are output in an order opposite to an input order. Accordingly, the second half of the cancellation pulse is finally generated.

Figure 6:
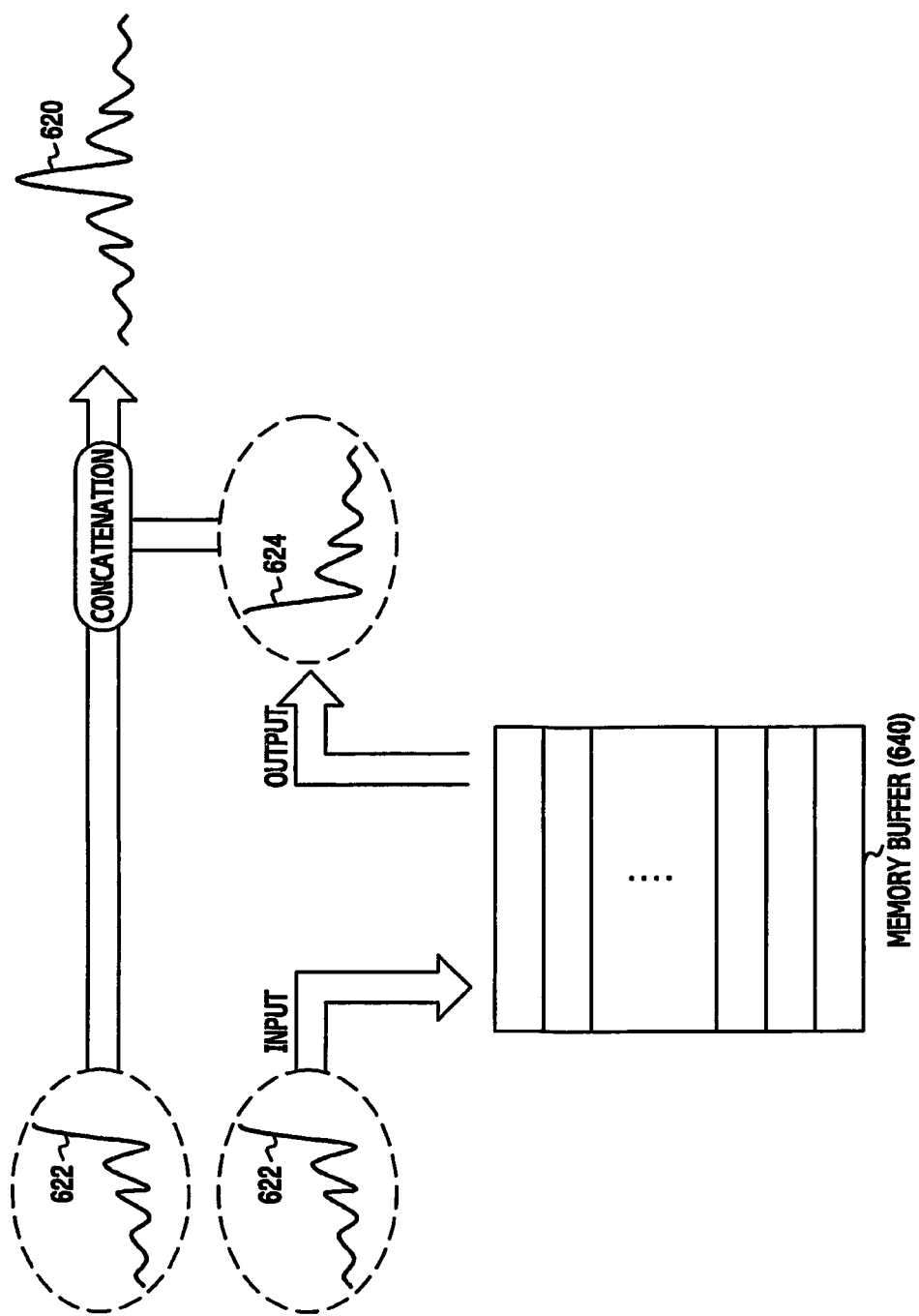
FIG. 6 illustrates generating of a cancellation pulse by using a memory buffer in a wireless communication system according to an exemplary embodiment of the present invention.

FIG. 6 illustrates generating of a cancellation pulse by using a memory buffer in a wireless communication system according to an exemplary embodiment of the present invention.

Referring to FIG. 6, the aforementioned transmission device generates a first half 622 of a cancellation pulse through scaling based on a complex gain corresponding to a magnitude of a detected peak, performs a conjugate operation on coefficient values belonging to the first half, and thereafter stores a result thereof in a memory buffer 640. Thereafter, the transmission device outputs the coefficient values in reverse order from the memory buffer 640. Herein, the conjugate operation may be performed when stored in the memory buffer 640. A second half 624 is delayed by a proper time for which a concatenation point is matched to the first half 622. Thereafter, an entire cancellation pulse 620 may be obtained by concatenating the first half 622 and the second half 624. Since the memory buffer 640 performs an output in reverse order of input, it may be referred to as a Last In First Output (LIFO) memory, and may be implemented by using a stack.

As shown in FIG. 6, by using the memory buffer, scaling for generating the second half of the cancellation pulse, that is, multiplication operations of the complex gain, may be excluded. Accordingly, a processing delay for generating the cancellation pulse is halved. For example, the processing delay is a half of a cancellation pulse length (a time of N/2 samples). Therefore, even if a different peak is generated within a processing time of N samples after peak detection, the transmission device may process the different peak.

Figure 7:
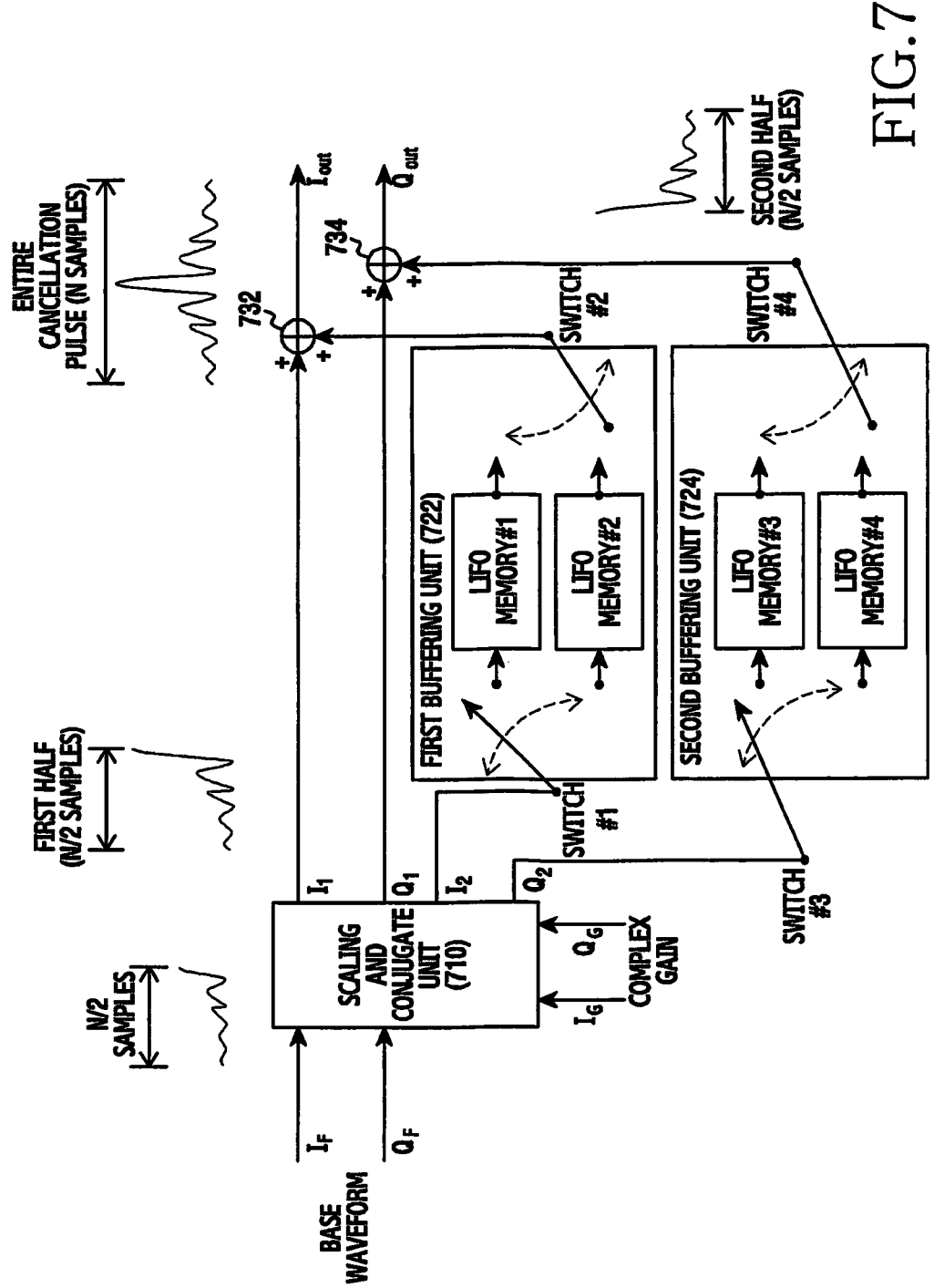
FIG. 7 illustrates a block diagram of a means for generating a cancellation pulse in a wireless communication system according to an exemplary embodiment of the present invention.

A cancellation pulse generation means for generating a cancellation pulse according to the principle of FIG. 6 may be configured as shown in FIG. 7 described below. FIG. 7 illustrates a block diagram of a means for generating a cancellation pulse in a wireless communication system according to an exemplary embodiment of the present invention. A configuration of the CPG 320 of FIG. 3 is exemplified in FIG. 7.

Referring to FIG. 7, the cancellation pulse generation means includes a scaling and conjugate unit 710, a first buffering unit 722, a second buffering unit 724, and adders 732 and 734.

The scaling and conjugate unit 710 scales a base waveform of the cancellation pulse according to a complex gain corresponding to a magnitude of a detected peak. A specific value of the base waveform is pre-defined according to a signal characteristic of a system. In this case, according to the exemplary embodiment of the present invention, the base waveform includes only a part corresponding to a first half of the entire cancellation pulse. Further, the scaling and conjugate unit 710 performs a conjugate operation on the scaled base waveform. The scaled cancellation pulse is provided to the adders 732 and 734, and the scaled and conjugated cancellation pulse is provided to the first buffering unit 722 and the second buffering unit 724. The scaling is performed by multiplying a value of the base waveform by the complex gain. Therefore, the scaling and conjugate unit 710 may be referred to as a 'complex multiplier with conjugate'. In this case, according to the exemplary embodiment of the present invention, the scaling and conjugate unit 710 generates only the first half of the cancellation pulse. Since only the first half is generated, the scaling and conjugate unit 710 does not perform an operation for a second half. Therefore, the scaling and conjugate unit 710 may perform an operation for the cancellation pulse for a subsequent next peak.

The first buffering unit 722 generates the second half of the cancellation pulse for an I component. The first buffering unit 722 stores sample values of the conjugated first half of the cancellation pulse provided from the scaling and conjugate unit 710 into a memory, and outputs the sample value in order opposite to a storing order. The first buffering unit 722 may generate a second half of one cancellation signal simultaneously by using a plurality of memory banks, and may store a first half of another cancellation signal. For this, the first buffering unit 722 may include a switch #1, a switch #2, an LIFO memory #1, and an LIFO memory #2. The switch #1 and the switch #2 are provided for conceptual meaning, and the first buffering unit 722 may perform a switch function by changing an address for accessing the memory. Further, although the LIFO memory #1 and the LIFO memory #2 are shown as a plurality of memories physically separated, they may be configured as physically one memory device.

The second buffering unit 724 generates the second half of the cancellation pulse for cancelling a Q component. The second buffering unit 724 stores sample values of the conjugated first half of the cancellation pulse provided from the scaling and conjugate unit 710 into the memory, and outputs the sample values in the order opposite to the storing order. The second buffering unit 724 may generate the second half of one cancellation signal simultaneously by using a plurality of memory banks and may store the first half of another cancellation signal. For this, the second buffering unit 724 may include a switch #3, a switch #4, an LIFO memory #3, and an LIFO memory #4. The switch #3 and the switch #4 are provided as conceptual meaning, and the second buffering unit 724 may perform a switch function by changing an address for accessing the memory. Further, although the LIFO memory #3 and the LIFO memory #4 are shown as a plurality of memories physically separated, they may be configured as physically one memory device.

The adders 732 and 734 concatenate the first half of the cancellation pulse provided from the scaling and conjugate unit 710 and the second half of the cancellation pulse provided from the first buffering unit 722 and the second buffering unit 724. That is, the adders 732 and 734 respectively correspond to an I component and a Q component, and generate the entire cancellation pulse by adding the second half after the first half.

When two peaks are generated continuously, an exemplary operation of the first buffering unit 722 and the second buffering unit 724 is as follows. When the two peaks are generated continuously, two cancellation pulses are required continuously. Initially, the switch #1, the switch #2, the switch #3, and the switch #4 are respectively connected to the LIFO memory #1, the LIFO memory #2, the LIFO memory #3, and the LIFO memory #4. Accordingly, when an I component and Q component of a conjugated first half of a first cancellation pulse is provided, the I component is stored in the LIFO memory #1 and the Q component is stored in the LIFO memory #3, and no value is output. In an initial state, since there is no value stored in the LIFO memory #2 and the LIFO memory #4, no value is output through the switch #2 and the switch #4.

The first half of the first cancellation pulse is scaled by the scaling and conjugate unit 710, and thereafter a connection state of the switch #1, the switch #2, the switch #3, and the switch #4 is changed to be opposite. That is, the switch #1, the switch #2, the switch #3, and the switch #4 are respectively connected to the LIFO memory #2, the LIFO memory #1, the LIFO memory #4, and the LIFO memory #3. Accordingly, values stored in the LIFO memory #1 are output through the switch #2 in reverse order of input, and values stored in the LIFO memory #3 are output through the switch #4 in reverse order of input. Accordingly, a second half of the first cancellation pulse is generated.

In this case, scaling starts for a first half of a second cancellation pulse. Accordingly, an I component and Q component of the conjugated first half of the second cancellation pulse are provided. According to a current connection state of switches, during the second half of the first cancellation pulse is output, the I component is stored in the LIFO memory #2 and the Q component is stored in the LIFO memory #4, and no value is output. Thereafter, the connection state of the switches is changed to be opposite, values stored in the LIFO memory #2 are output through the switch #2 in reverse order of input, and values stored in the LIFO memory #4 are output through the switch #4 in reverse order of input. Accordingly, a second half of the second cancellation pulse is generated.

FIG. 8 is a conceptual view illustrating a procedure of generating a cancellation pulse in a wireless communication system according to an exemplary embodiment of the present invention. In FIG. 8, multiplication operations and summation operations with the structure of FIG. 7 are illustrated.

Referring to FIG. 8, multiplication is performed between a real component 871 of a noise shaping filter and a real component 881 of a complex gain, multiplication is performed between an imaginary component 873 of the noise shaping filter and an imaginary component 883 of the complex gain, multiplication is performed between the real component 871 of the noise shaping filter and the imaginary component 883 of the complex gain, and multiplication is performed between the imaginary component 873 of the noise shaping filter and the real component 881 of the complex gain. Herein, the real component 871 of the noise shaping filter and the imaginary component 873 of the noise shaping filter include only a first half of the entire cancellation pulse. A result of the multiplication between the real component 871 of the noise shaping filter and the real component 881 of the complex gain is denoted by 'A'. A result of the multiplication between the imaginary component 873 of the noise shaping filter and the imaginary component 883 of the complex gain is denoted by 'B'. A result of the multiplication between the real component 871 of the noise shaping filter and the imaginary component 883 of the complex gain is denoted by 'C'. A result of the multiplication between the imaginary component 873 of the noise shaping filter and the real component 881 of the complex gain is denoted by 'D'. Herein, the multiplication operation may include a conjugate operation.

Thereafter, a real component 891 of a first half is generated by subtracting the multiplication result A and the multiplication result B. An imaginary component 893 of the first half is generated by adding the multiplication result C and the multiplication result D. A real component 895 of a second half is generated by adding the multiplication result A and the multiplication result B. An imaginary component 897 of the second half is generated by subtracting the multiplication result A and the multiplication result B.

When the cancellation pulse is generated by using the memory buffer as described above, continuous peaks may be processed as shown in FIGS. 9A to 9E described below.

FIGS. 9A to 9E illustrate another example of a result of processing continuous peaks in a wireless communication system according to an exemplary embodiment of the present invention.

Figure 9A:
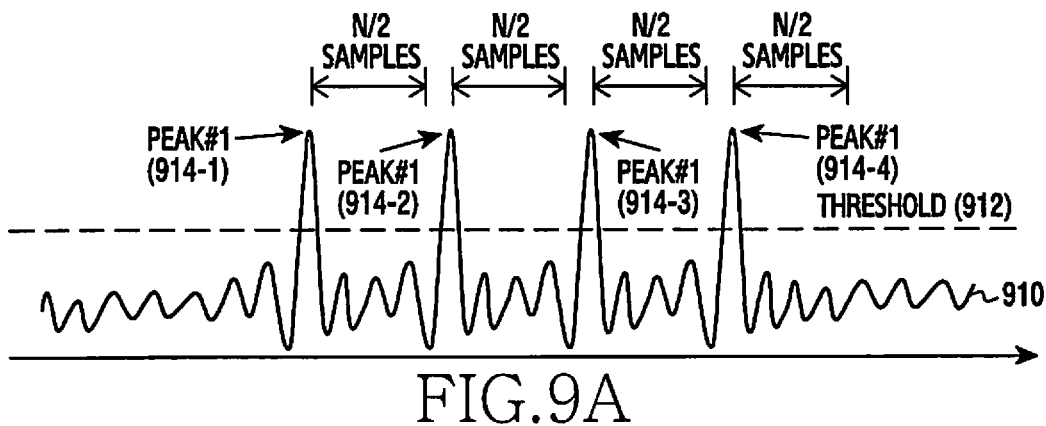
FIGS. 9A to 9E illustrate another example of a result of processing continuous peaks in a wireless communication system according to an exemplary embodiment of the present invention.
Figure 9B:
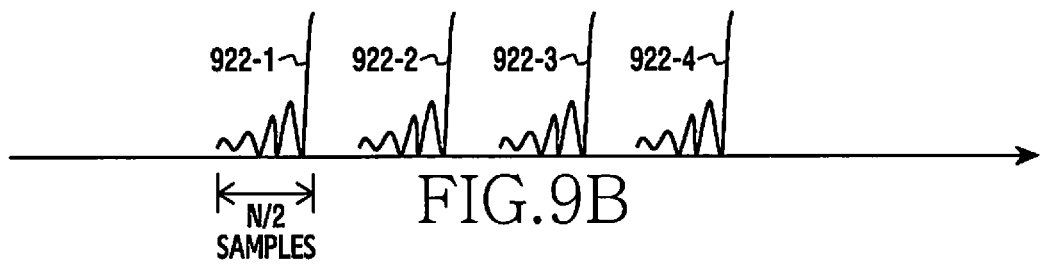
Figure 9C:
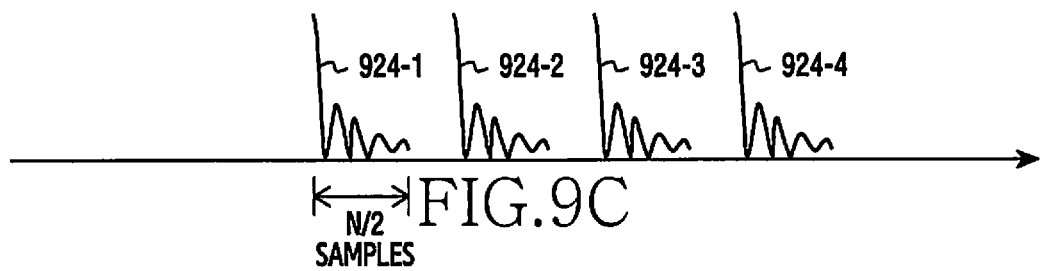
Figure 9D:
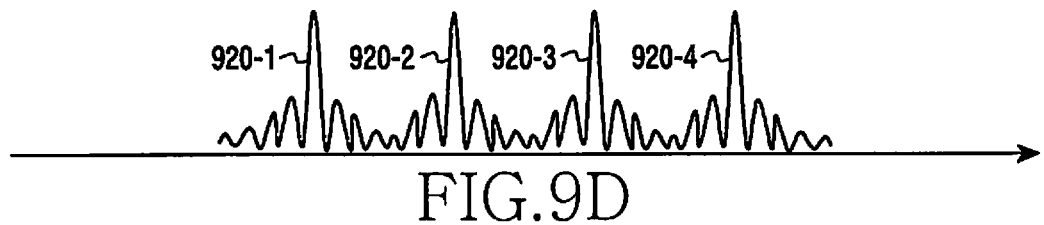
Figure 9E:

Specifically, FIG. 9A illustrates an initial signal 910, FIG. 9B illustrates first halves 922-1 to 922-4 of a cancellation pulse generated by multiplication of a complex gain, FIG. 9C illustrates second halves 924-1 to 924-4 of a cancellation pulse generated by a conjugate operation, FIG. 9D illustrates entire cancellation pulses 920-1 to 920-4, and FIG. 9E illustrates a peak-cancelled signal 930.

Referring to FIG. 9A, the initial signal 910 includes 4 peaks 914-1 to 914-4 exceeding a threshold 912. A transmission device detects the peak #1 914-1, and as shown in FIG. 9B, generates the first half 922-1 of a cancellation pulse #1 for cancelling the peak #1 914-1. The first half 922-1 of the cancellation pulse #1 includes N/2 samples. In this case, the first half 922-1 of the cancellation pulse #1 is stored in a memory buffer. Further, as shown in FIG. 9C, the second half 924-1 of the cancellation pulse #1 is generated by being output from the memory buffer. Accordingly, the cancellation pulse #1 920-1 may be generated as shown in FIG. 9D. That is, after the first half 922-1 of the cancellation pulse #1 is generated, a cancellation pulse generation means of the transmission device does not generate the second half 924-1 of the cancellation pulse #1. Accordingly, the cancellation pulse generation means may operate for the next peak #2 914-2.

During the second half 924-1 of the cancellation pulse #1 is output from the memory buffer as shown in FIG. 9C, the transmission device generates the first half 922-1 of the cancellation pulse #2 for the peak #2 914-2 as shown in FIG. 9B. The first half 922-2 of the cancellation pulse #2 is stored in the memory buffer, and as shown in FIG. 9C, the second half 924-2 of the cancellation pulse #2 is generated by being output from the memory buffer. Accordingly, the cancellation pulse #2 920-2 may be generated as shown in FIG. 9D.

During the second half 924-2 of the cancellation pulse #2 is output from the memory buffer as shown in FIG. 9C, the transmission device generates the first half 922-3 of the cancellation pulse #3 for the peak #3 914-3 as shown in FIG. 9B. The first half 922-3 of the cancellation pulse #3 is stored in the memory buffer, and as shown in FIG. 9C, the second half 924-3 of the cancellation pulse #3 is generated by being output from the memory buffer. Accordingly, the cancellation pulse #3 920-3 may be generated as shown in FIG. 9D.

During the second half 924-3 of the cancellation pulse #3 is output from the memory buffer as shown in FIG. 9C, the transmission device generates the first half 922-4 of the cancellation pulse #4 for the peak #4 914-4 as shown in FIG. 9B. The first half 922-4 of the cancellation pulse #4 is stored in the memory buffer, and as shown in FIG. 9C, the second half 924-4 of the cancellation pulse #4 is generated by being output from the memory buffer. Accordingly, the cancellation pulse #4 920-4 may be generated as shown in FIG. 9D.

Through the aforementioned procedure, as shown in FIG. 9D, the four cancellation pulses 920-1 to 920-4 are generated to cancel the four peaks 914-1 to 914-4. Accordingly, the four peaks 914-1 to 914-4 may be attenuated or cancelled to be below the threshold 912.

Figure 10:
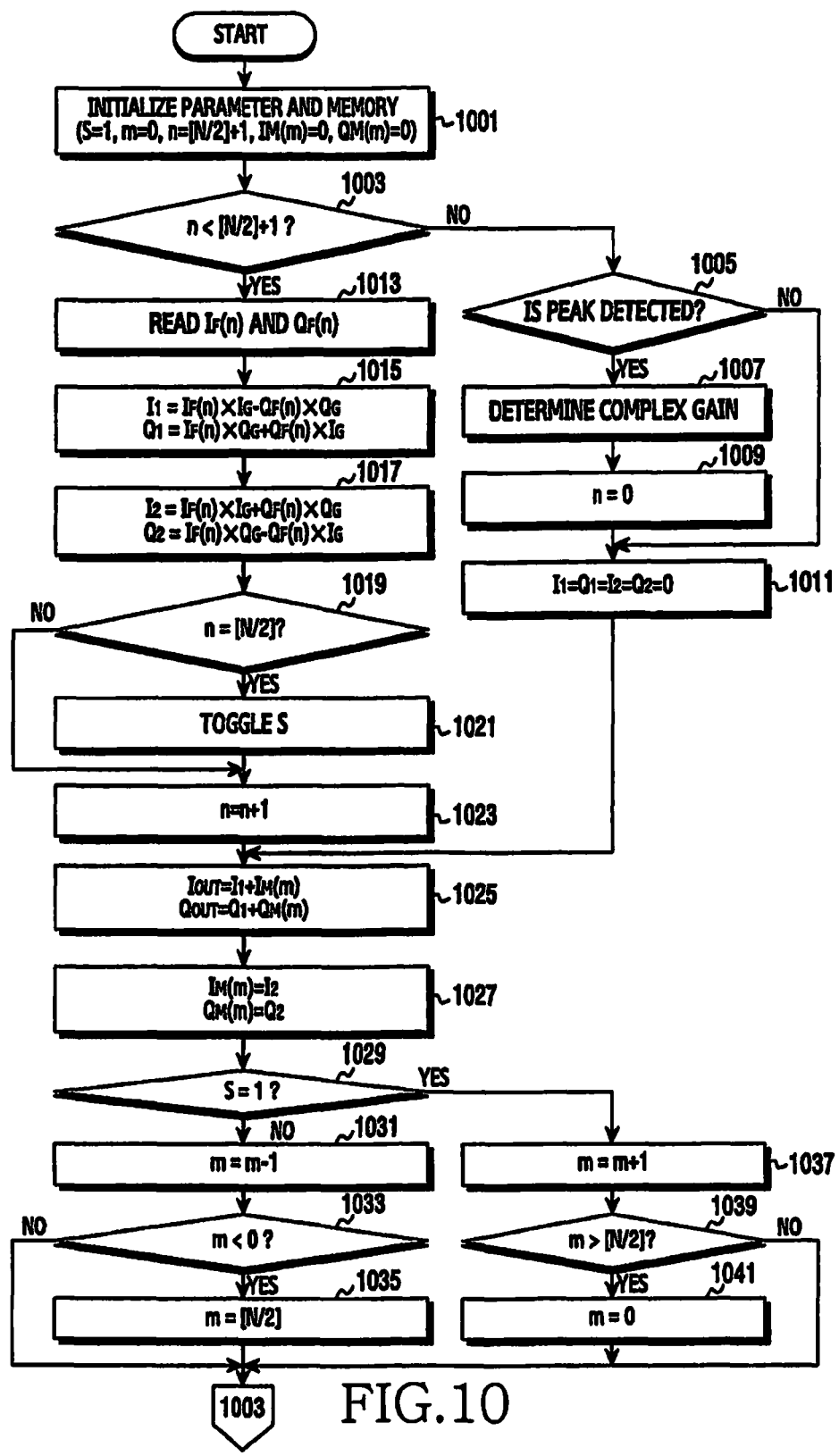
FIG. 10 illustrates a procedure of generating a cancellation pulse in a wireless communication system according to an exemplary embodiment of the present invention.

FIG. 10 illustrates a procedure of generating a cancellation pulse in a wireless communication system according to an exemplary embodiment of the present invention. Hereinafter, an entity for generating the cancellation pulse is referred to as a CPG.

Referring to FIG. 10, the CPG initializes parameters and a memory in step 1001. The parameters includes 'S' for indicating a status of a binary switch, 'm' for indicating an index or address of the memory, and 'n' for indicating a coefficient index of a noise shaping filter. The switch status S defines a direction for the memory index m. According to a value of the switch status S, a value of the memory index m may be increased or decreased. When data is recorded, the memory index m proceeds in one direction, whereas when the data is extracted, the memory index m proceeds in an opposite direction. In the step 1001, the switch status S is initialized to '1', the memory index m is initialized to '0', and the coefficient index 'n' is initialized to [N/2]. The N is the number of coefficients of the noise shaping filter, that is, a length thereof, and is the same as a length of the cancellation pulse. The memory is for storing the second half of the cancellation pulse, and is divided into $I_M$ for a real component and $Q_M$ for an imaginary component. $I_M(m)$ denotes an $m^{th}$ storage space of the memory for the real component, and $Q_M(m)$ denotes an $m^{th}$ storage space of the memory for the imaginary component. Herein, the memory index m is an integer number greater than or equal to 0 and less than or equal to [N/2]−1. The switch status S, the memory index m, and the memories $I_M$ and $Q_M$ implement an LIFO function. Next, when a rising edge of a clock cycle arrives, the CPG performs subsequent steps 1003 to 1041. That is, the subsequent steps 1003 to 1041 are performed one time in every rising edge of the clock.

Proceeding to step 1003, the CPG determines whether the coefficient index n is less than [N/2]+1. If the coefficient index n is not less than [N/2]+1, proceeding to step 1005, the CPG determines whether a peak is detected. If the peak is not detected, the CPG proceeds step 1011. Otherwise, if the peak is detected, proceeding to step 1007, the CPG determines a complex gain. The complex gain may be provided as a means for detecting the peak. Next, proceeding to step 1009, the CPG sets the coefficient index n to '0'. Proceeding to step 1011, the CPG initializes a value of the first half and second half of the cancellation pulse to '0'. In FIG. 10, a real component of the first half of the cancellation pulse is denoted by $I_1$, an imaginary component of the first half of the cancellation pulse is denoted by $Q_1$, a real component of the second half of the cancellation pulse is denoted by $I_2$, and an imaginary component of the second half of the cancellation pulse is denoted by $Q_2$. Next, the CPG proceeds to step 1025.

If the coefficient index n is less than [N/2]+1 in step 1003, proceeding to step 1013, the CPG reads an $n^{th}$ coefficient of the noise shaping filter. In FIG. 10, a real component of the $n^{th}$ coefficient of the noise shaping filter is denoted by $I_F(n)$, and an imaginary component of the $n^{th}$ coefficient of the noise shaping filter is denoted by $Q_F(n)$.

Next, proceeding to step 1015, the CPG determines an $n^{th}$ coefficient of the first half of the cancellation pulse by using a complex gain and the $n^{th}$ coefficient of the noise shaping filter. In FIG. 10, a real component of the complex gain is denoted by $I_G$, and an imaginary component of the complex gain is denoted by $Q_G$. Specifically, the CPG may determine the real component of the $n^{th}$ coefficient of the first half of the cancellation pulse by subtracting a product of the imaginary component of the $n^{th}$ coefficient of the noise shaping filter and the imaginary component of the complex gain from a product of the real component of the $n^{th}$ coefficient of the noise shaping filter and the real component of the complex gain, and may determine the imaginary component of the $n^{th}$ coefficient of the first half of the cancellation pulse by adding a product of the real component of the $n^{th}$ coefficient of the noise shaping filter and the imaginary component of the complex gain and a product of the imaginary component of the $n^{th}$ coefficient of the noise shaping filter and the real component of the complex gain.

Next, proceeding to step 1017, the CPG determines the $n^{th}$ coefficient of the second half of the cancellation pulse by using the complex gain and the $n^{th}$ coefficient of the noise shaping filter. Specifically, the CPG may determine the real component of the $n^{th}$ coefficient of the second half of the cancellation pulse by adding a product of the imaginary component of the $n^{th}$ coefficient of the noise shaping filter and the imaginary component of the complex gain from a product of the real component of the $n^{th}$ coefficient of the noise shaping filter and the real component of the complex gain, and may determine the imaginary component of the $n^{th}$ coefficient of the second half of the cancellation pulse by subtracting a product of the real component of the $n^{th}$ coefficient of the noise shaping filter and the imaginary component of the complex gain and a product of the imaginary component of the $n^{th}$ coefficient of the noise shaping filter and the real component of the complex gain.

Next, proceeding to step 1019, the CPG determines whether the n is equal to [N/2]. If the n is not equal to [N/2], the CPG proceeds to step 1023. Otherwise, if the n is equal to [N/2], proceeding to step 1021, the CPG toggles the switch status S, and proceeds to step 1023. It should be noted that a toggled switch status S is not equivalent to the switch status S before toggling.

In step 1023, the CPG increases the coefficient index n by 1.

In step 1025, the CPG determines a CPG output by using a value stored in a memory and a complex multiplication result. In FIG. 10, a real component of the CPG output is denoted by $I_{OUT}$, and an imaginary component of the CPG output is denoted by $Q_{OUT}$. Specifically, the CPG may determine the real component of the output by adding a value stored in an memory address m for the real component and the real component of the cancellation pulse, and may determine the real component of the output by adding a value stored in a memory address m for the imaginary component and the imaginary component of the cancellation pulse.

Next, proceeding to step 1027, the CPG stores the second half of the cancellation pulse in the memory. Specifically, the CPG may store the real component of the cancellation pulse to the memory address m for the real component, and may store the imaginary component of the cancellation pulse to the memory address m for the imaginary component.

Next, proceeding to step 1029, the CPG confirms whether the switch status S is 1. If the switch status S is not 1, proceeding to step 1031, the CPG decreases the address index m by 1, and thereafter proceeding to step 1033, determines whether the m is less than 0. If the m is not less than 0, the CPG returns to step 1003. Otherwise, if the m is less than 0, proceeding to step 1035, the CPG sets the m to [N/2], and thereafter returns to step 1003. If the switch status S is 1 in the step 1029, proceeding to step 1037, the CPG increases the address index m by 1, and thereafter proceeding to step 1039, determines whether the m is greater than [N/2]. If the m is not greater than [N/2], the CPG returns to the step 1003. Otherwise, if the m is greater than [N/2], proceeding to step 1041, the CPG sets the m to 0, and thereafter returns to the step 1003.

Figure 11:
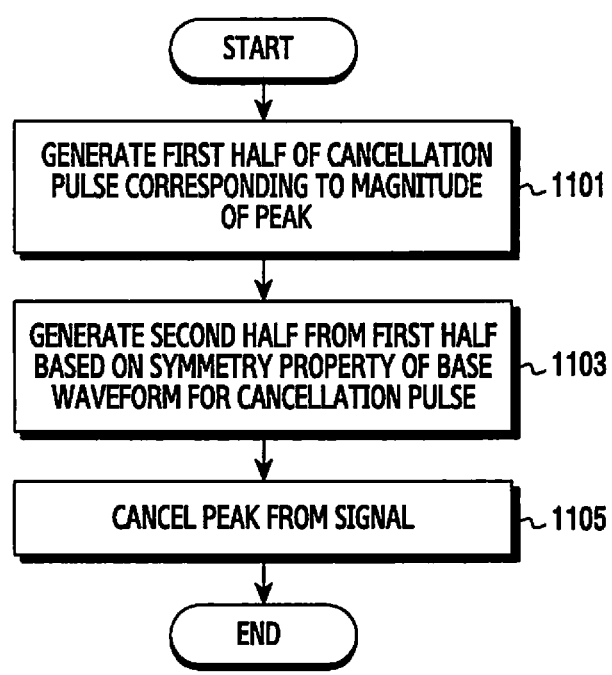
FIG. 11 illustrates a procedure of operating a transmission device in a wireless communication system according to an exemplary embodiment of the present invention.

FIG. 11 illustrates a procedure of operating a transmission device in a wireless communication system according to an exemplary embodiment of the present invention.

Referring to FIG. 11, the transmission device generates a first half of a cancellation pulse corresponding to a magnitude of a peak in step 1101. The cancellation pulse is a signal for cancelling or attenuating a peak detected from a transmission signal, and has a magnitude corresponding to the magnitude of the peak. The magnitude of the cancellation pulse is determined according to a complex gain corresponding to the magnitude of the peak. The first half is a part of the cancellation pulse. For example, the transmission device may generate the first half of the cancellation pulse by multiplying a pre-defined base waveform of the cancellation pulse by the complex gain.

For example, the transmission device may determine a real component of each coefficient of the first half of the cancellation pulse by subtracting a product of an imaginary component of an $n^{th}$ coefficient of the base waveform and an imaginary component of the complex gain from a product of a real component of the $n^{th}$ coefficient of the base waveform and a real component of the complex gain. Further, the transmission device may determine an imaginary component of each coefficient of the first half of the cancellation pulse by adding a product of a real component of each coefficient and the imaginary component of the complex gain and a product of the imaginary component of the base waveform and the imaginary component of the complex gain.

Next, proceeding to step 1103, the transmission device generates the second half from the first half on the basis of the symmetric property of the base waveform for the cancellation pulse. The second half implies a part remaining after excluding a part corresponding to the first half from the cancellation pulse. The cancellation pulse has a bilateral symmetry property by a maximum value, and in this case, the first half and the second half have a conjugate relation, in other words, a relation in which an imaginary component has an opposite sign. Therefore, the transmission device may generate the second half by applying a conjugation operation to coefficients belonging to the first half and by sorting them in reverse order.

According to one exemplary embodiment of the present invention, the transmission device may perform the conjugate operation by changing a sign of an imaginary component of coefficients belonging to the first half. According to another exemplary embodiment of the present invention, the transmission device may determine the conjugated coefficients directly from the base waveform and the complex gain. For example, the transmission device may determine a real component of each coefficient of the second half of the cancellation pulse by adding a product of a real component of each coefficient of the base waveform and an imaginary component of the complex gain and a product of an image component of each coefficient of the base waveform and an imaginary component of the complex gain. Further, the transmission device may determine an imaginary component of each coefficient of the second half of the cancellation pulse by subtracting a product of an imaginary component of each coefficient of the base waveform and an imaginary component of the complex gain and a product of an image component of each coefficient of the base waveform and a real component of the complex gain.

Thereafter, proceeding to step 1105, the transmission device cancels the peak from the transmission signal. That is, the transmission device cancels the peak by subtracting the cancellation pulse from the transmission signal. For this, the transmission device may match the cancellation pulse to a position of the peak on a time axis. For example, the transmission device may delay the transmission signal by a processing time for generating the cancellation pulse.

Although not shown in FIG. 11, the transmission device may detect the peak from the transmission signal, measure a magnitude of the peak, and thereafter determine a complex gain corresponding to the magnitude. The complex gain is used when the cancellation pulse is generated.

In the example shown in FIG. 11, the transmission device sorts the coefficients belonging to the first half in reverse order to generate the second half of the cancellation pulse. Herein, the reverse-order sorting may be performed by using a memory buffer. That is, the reverse-order sorting may be performed by using a stack-type memory which outputs data in an order opposite to an input order. For this, in step 1101, the transmission device may store the coefficients into the memory whenever each of the coefficients belonging to the first half is determined. In this case, according to one exemplary embodiment of the present invention, the transmission device may perform the conjugate operation on the coefficients before being stored in the memory. According to another exemplary embodiment of the present invention, the transmission device may perform the conjugate operation after extracting the coefficients from the memory.

Figure 12:
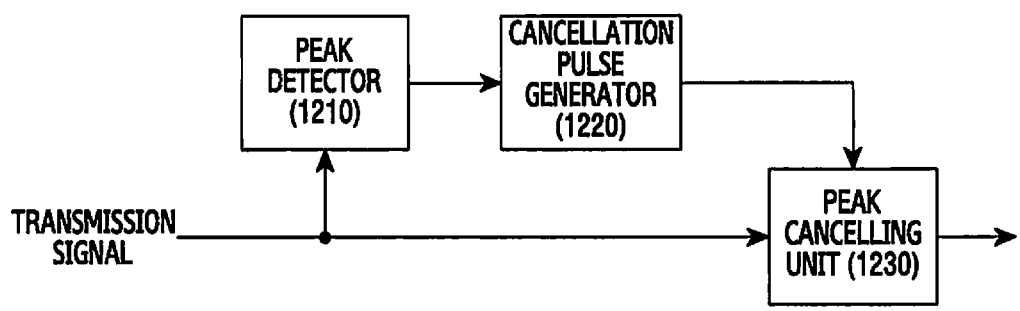
FIG. 12 illustrates a block diagram of a transmission device in a wireless communication system according to an exemplary embodiment of the present invention.

FIG. 12 illustrates a block diagram of a transmission device in a wireless communication system according to an exemplary embodiment of the present invention. The structure exemplified in FIG. 12 is a part of the transmission device, and may be included as a part of a means for processing a digital signal.

Referring to FIG. 12, the transmission device includes a peak detector 1210, a cancellation pulse generator 1220, and a peak cancelling unit 1230.

The peak detector 1210 may detect a peak from a transmission signal, measure a magnitude of the peak, and thereafter determine a complex gain corresponding to the magnitude. The complex gain is used when the cancellation pulse is generated. Therefore, the peak detector 1210 provides the complex gain to the cancellation pulse generator 1220.

The cancellation pulse generator 1220 generates a cancellation pulse for cancelling the peak. A specific waveform of the cancellation pulse is pre-defined according to a signal characteristic of a system. That is, the cancellation pulse generator 1220 pre-stores a base waveform of the cancellation pulse, and generates the cancellation pulse corresponding to the peak from the base waveform according to a complex gain provided from the peak detector 1210. According to one exemplary embodiment, the cancellation pulse generator 1220 generates a part of the cancellation pulse by using the base waveform and the complex gain, and generates the remaining parts on the basis of a symmetry property of the base waveform for the cancellation pulse. For example, the cancellation pulse generator 1220 may generate a first half of the cancellation pulse by multiplying the base waveform and the complex gain, and may generate a second half by performing a conjugation operation and reverse-order sorting on coefficients belonging to the first half. The reverse-order sorting may be performed by using a stack-type memory which outputs data in an order opposite to an input order. For this, the cancellation pulse generator 1220 may include at least one memory. In this case, the cancellation pulse generator 1220 may store the coefficients into the memory whenever each of the coefficients belonging to the first half is determined. In this case, according to one exemplary embodiment of the present invention, the cancellation pulse generator 1220 may perform the conjugate operation on the coefficients before being stored in the memory. According to another exemplary embodiment of the present invention, the cancellation pulse generator 1220 may perform the conjugate operation after extracting the coefficients from the memory.

The peak cancelling unit 1230 cancels or attenuates the peak from the transmission signal. For example, the peak cancelling unit 1230 may cancel the peak by subtracting the cancellation pulse from the transmission signal. For this, the peak cancelling unit 1230 may include at least one subtractor. In addition, the peak cancelling unit 1230 may further include a delay component to match the cancellation pulse to a position of the peak on a time axis.

Although not shown in FIG. 12, the transmission device may further include at least one amplifier for amplifying the peak-cancelled transmission signal. In addition, the transmission device may further include a Digital-to-Analog Converter (DAC) for converting a digital signal to an analog signal.

Figure 13:
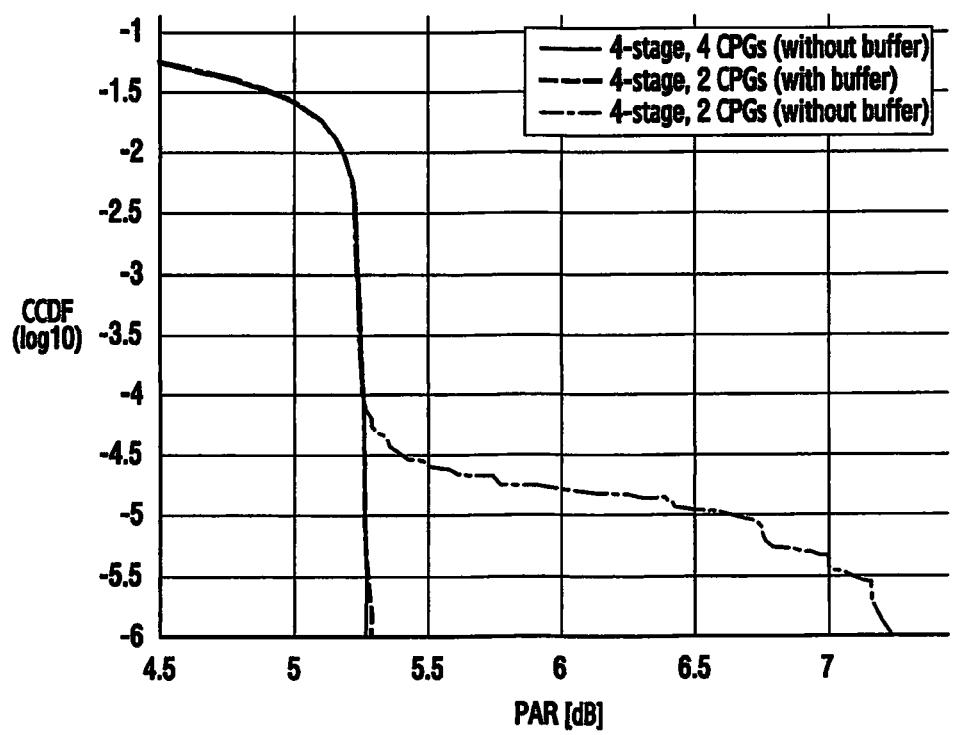
FIG. 13 illustrates a simulation experiment result of a method of reducing a PAR according to an exemplary embodiment of the present invention.

FIG. 13 illustrates a simulation experiment result of a method of reducing a PAR according to an exemplary embodiment of the present invention. In FIG. 13, a Complementary Cumulative Distribution Function (CCDF) is shown depending on a PAR change of a signal. In FIG. 13, the CCDF is expressed in a log scale. A 4-stage structure in which 4 peak cancellation means are connected is shown in the simulation experiment result of FIG. 13.

In FIG. 13, 'with buffer' implies a case where a cancellation pulse is generated by using a symmetry property, and 'without buffer' implies a case where the entire cancellation pulse is generated through multiplication of a base waveform and a complex gain. A chain line indicates performance in case of having two CPGs without the buffer. A dotted line indicates performance in case of having two CPGs with the buffer. A solid line indicates performance in case of having 4 CPGs without the buffer.

Referring to FIG. 13, it is confirmed that performance is superior when the buffer is used. In case of using the buffer, although only two CPGs are provided, it is confirmed that performance is similar to a case of having 4 CPGs. In case of having the 4 CPGs, since the number of required multipliers is two times the case of having the 2 CPGs, it is confirmed that performance is much superior when using the buffer.

In addition to the CCDF measurement result, a comparison result of a case of using a symmetry property and a case of not using the symmetry property is as follows.

First, a base waveform to be stored, that is, a length of a noise shaping filter, is halved. This implies that a delay is decreased when a cancellation pulse is generated. Second, additional LIFO memory blocks for reversing an order of a conjugated control pulse are required. Third, a complex multiplier for providing a conjugate operation and a multiplication operation has a different structure.

In summary, in case of using the symmetry property, a processing time of a CPG is decreased by ½, but an additional multiplier is not required. Further, due to an improved processing delay, the number of CPG units may be decreased.

Methods based on the embodiments disclosed in the claims and/or specification of the present invention can be implemented in hardware, software, or a combination of both.

When implemented in software, computer readable recording medium for storing one or more programs (i.e., software modules) can be provided. The one or more programs stored in the computer readable recording medium are configured to be executed by one or more processors in an electronic device. The one or more programs include instructions for allowing the electronic device to execute the methods based on various exemplary embodiments disclosed in the claims and/or specification of the present invention.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory may be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can access the electronic device via an external port. In addition, an additional storage unit on a communication network can access a device for performing an exemplary embodiment of the present invention.

In the aforementioned specific example embodiments of the present invention, a constitutional element included in the invention is expressed in a singular or plural form according to the specific example embodiment proposed herein. However, the singular or plural expression is selected properly for a situation proposed for the convenience of explanation, and thus the various exemplary embodiments of the present invention are not limited to a single or a plurality of constitutional elements. Therefore, a constitutional element expressed in a plural form can also be expressed in a singular form, or vice versa.

While the present invention has been shown and described with reference to certain preferred embodiments thereof, it will be understood by those skilled in the art that various changes in form and details may be made therein without departing from the spirit and scope of the present invention as defined by the appended claims. Therefore, the scope of the present invention is defined not by the detailed description thereof but by the appended claims, and all differences within equivalents of the scope will be construed as being included in the present invention.

The invention claimed is:

1. A method for operating a transmission device in a wireless communication system, the method comprising:
    detecting a first peak and a second peak of an original signal;
    generating, based on a complex gain of the first peak of the original signal, a first portion of a first cancelling pulse for attenuating the first peak;
    storing coefficients corresponding to the first portion of the first cancelling pulse in an order;
    generating a second portion of the first cancelling pulse by outputting the stored coefficients in a reverse order with respect to the order, during a process in which coefficients corresponding to a first portion of a second cancelling pulse for attenuating the second peak are stored; and
    generating a transmission signal by applying the first cancelling pulse and the second cancelling pulse to the original signal.

2. The method of claim 1, wherein detecting the first peak and the second peak comprises:
    receiving the original signal; and
    detecting the first peak and the second peak of the original signal by comparing a value of magnitude for the original signal and a threshold value.

3. The method of claim 2, wherein generating the first portion of the first cancelling pulse comprises:
    determining the complex gain based on the magnitude of the detected first peak of the original signal; and
    multiplying the complex gain by a base waveform including a plurality of samples with coefficients.

4. The method of claim 2, wherein the complex gain is proportional to the magnitude of the first peak.

5. The method of claim 1, wherein the first cancelling pulse is divided into the first portion and the second portion at a maximum value,
    wherein the second portion is a portion of the first cancelling pulse, except for the first portion of the first cancelling pulse,
    wherein the first portion of the first cancelling pulse is followed by the second portion of the first cancelling pulse, and
    wherein the second portion of the first cancelling pulse is identical to a conjugate of the first portion of the first cancelling pulse.

6. An apparatus for a transmission device in a wireless communication system, the apparatus comprising:
    at least one memory;
    a peak detector configured to detect a first peak and a second peak of an original signal;
    a generator configured to:
        generate, based on a complex gain of the first peak of the original signal, a first portion of a first cancelling pulse for attenuating the first peak,
        store coefficients corresponding to the first portion of the first cancelling pulse in an order, and
        generate a second portion of the first cancelling pulse by outputting the stored coefficients in a reverse order with respect to the order during a process in which coefficients corresponding to a first portion of a second cancelling pulse for attenuating the second peak is stored; and a cancelling unit, which includes at least one subtractor, configured to generate a transmission signal by applying the first cancelling pulse and the second cancelling pulse to the original signal.

7. The apparatus of claim 6, wherein the peak detector is further configured to:

receive the original signal; and detect the first peak and the second peak of the original signal by comparing a value of magnitude for the original signal and a threshold value.

8. The apparatus of claim 7, wherein the generator is further configured to:

determine the complex gain based on the magnitude of the detected first peak of the original signal; and multiply the complex gain by a base waveform including a plurality of samples.

9. The apparatus of claim 7, wherein the complex gain is proportional to the magnitude of the first peak.

10. The apparatus of claim 6, wherein the first cancelling pulse is divided into the first portion and the second portion at a maximum value, wherein the second portion is a portion of the first cancelling pulse, except for the first portion of the first cancelling pulse, wherein the first portion of the first cancelling pulse is followed by the second portion of the first cancelling pulse, and wherein the second portion of the first cancelling pulse is identical to a conjugate of the first portion of the first cancelling pulse.

* * * * *